United States Patent
Wang et al.

(10) Patent No.: US 9,651,235 B2
(45) Date of Patent: May 16, 2017

(54) LED LIGHT STRIP WHEREIN THE LEDS OVERLAP IN PROJECTION BACKLIGHT AND DISPLAY DEVICE HAVING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Hetao Wang, Beijing (CN); Kun Lu, Beijing (CN); Ling Bai, Beijing (CN); Zhanchang Bu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 73 days.

(21) Appl. No.: 14/422,132

(22) PCT Filed: Jul. 9, 2014

(86) PCT No.: PCT/CN2014/081882
§ 371 (c)(1),
(2) Date: Feb. 17, 2015

(87) PCT Pub. No.: WO2015/113377
PCT Pub. Date: Aug. 6, 2015

(65) Prior Publication Data
US 2016/0025320 A1 Jan. 28, 2016

(30) Foreign Application Priority Data

Jan. 28, 2014 (CN) .......................... 2014 1 0042590

(51) Int. Cl.
*F21V 8/00* (2006.01)
*F21S 4/00* (2016.01)
(Continued)

(52) U.S. Cl.
CPC ............ *F21V 29/10* (2015.01); *G02B 6/0068* (2013.01); *G02B 6/0073* (2013.01);
(Continued)

(58) Field of Classification Search
CPC ................ G02B 6/0068; G02B 6/0073; G02F 1/133603; G02F 1/133611;
(Continued)

(56) References Cited

U.S. PATENT DOCUMENTS

2012/0155063 A1  6/2012  Lee et al.

FOREIGN PATENT DOCUMENTS

CN  102620194 A  8/2012
CN  103807675 A  5/2014
(Continued)

OTHER PUBLICATIONS

Machine translation of CN102620194 A, retrieved Aug. 24, 2016 from Espacenet.com.*

(Continued)

*Primary Examiner* — Anh Mai
*Assistant Examiner* — Steven Horikoshi
(74) *Attorney, Agent, or Firm* — Harness, Dickey & Pierce, P.L.C.

(57) ABSTRACT

The LED light strip according to the present disclosure may include a circuit board and a plurality of LEDs which are arranged and spaced on the circuit board along a first straight line. A gap may be formed between two adjacent LEDs. Projections of two adjacent LEDs on a first projection plane may at least partially overlap, and the first projection plane may be a plane perpendicular to the circuit board and parallel to the first straight line.

20 Claims, 5 Drawing Sheets

(51) Int. Cl.
*F21V 29/10* (2015.01)
*G02F 1/1335* (2006.01)

(52) U.S. Cl.
CPC .. *G02F 1/133603* (2013.01); *G02F 1/133611* (2013.01); *G02F 1/133615* (2013.01)

(58) Field of Classification Search
CPC ......... G02F 1/133613; G02F 1/133615; F21V 29/002; F21V 29/004; F21V 29/02; F21V 29/10; F21Y 2103/00; F21Y 2103/10
See application file for complete search history.

(56) References Cited

FOREIGN PATENT DOCUMENTS

| | | |
|---|---|---|
| JP | 2004342472 A | 12/2004 |
| JP | 2010266543 A | 11/2010 |

OTHER PUBLICATIONS

International Search Report and Written Opinion mailed Oct. 27, 2014 regarding PCT/CN2014/081882. Translation provided by Dragon Intellectual Property Law Firm.

Chinese Office Action mailed Jun. 1, 2015 regarding Chinese Application No. 201410042590.4 Translation provided by Dragon Intellectual Property Law Firm.

Second Office Action regarding Chinese application No. 201410042590.4, dated Nov. 16, 2015. Translation provided by Dragon Intellectual Property Law Firm.

\* cited by examiner

-PRIOR ART-

-PRIOR ART-

-PRIOR ART-

LED LIGHT STRIP WHEREIN THE LEDS OVERLAP IN PROJECTION BACKLIGHT AND DISPLAY DEVICE HAVING THE SAME

CROSS-REFERENCE TO RELATED APPLICATION APPLICATIONS

This application is the U.S. national phase of PCT Application No. PCT/CN2014/081882 filed on Jul. 9, 2014, which claims priority to Chinese Patent Application No. 201410042590.4 filed on Jan. 28, 2014, the disclosures of which are incorporated in their entirety by reference herein.

TECHNICAL FIELD

The present disclosure relates to the field of liquid crystal module technology, in particular to a light emitting diode (LED) light strip, a backlight and a display device.

BACKGROUND

As shown in FIG. 1, a backlight of a conventional liquid crystal module includes an LED light strip 10, a light guide plate 20 and so forth. Specifically, the light guide plate 20 includes a light-entering surface 21, a light-exiting surface 22 adjacent to the light-entering surface 21 and a bottom surface 23 opposite to the light-exiting surface 22, and the LED light strip is arranged on a side of the light-entering surface 21 of the light guide plate 20. Light emitted from the LED is incident to the light guide plate 20 to achieve a total internal reflection, and is propagated in the light guide plate 20. When the light is incident to the grid-points on the bottom surface 23 of the light guide plate 20, a diffuse reflection occurs, which changes the original light propagation angle and deteriorates the total internal reflection. And then light emits from the light-exiting surface 22 of the light guide plate 20 and forms a surface light source.

As shown in FIG. 1 and FIG. 2, in the backlight of the conventional liquid crystal module, the LED light strip includes a printed circuit board (PCB) 11 and a plurality of LEDs 12 which are arranged and spaced on the PCB 11. A gap 30 is formed between two adjacent LEDs 12, which have rectangular package structures. As shown in FIG. 3, since there is no light possible to emit into the light guide plate 20, little light emits at a position which is located on a side, near to the LED light strip, of the light guide plate 20, and at which the gap 30 between the two adjacent LEDs 12 is located, thereby forming a region darker than surrounding regions. Thus, a hotspot phenomenon having alternate light regions and dark regions occurs on the display screen of the liquid crystal module.

SUMMARY

An object of the present disclosure is to provide an LED light strip, a backlight and a display device, which can improve the hotspot phenomenon caused by the existence of gaps between adjacent LEDs in the LED light strip.

Technical solutions provided by the present disclosure are as follows.

A light emitting diode (LED) light strip includes a circuit board and a plurality of LEDs which are arranged and spaced on the circuit board along a first straight line, wherein a gap is formed between two adjacent LEDs; and wherein projections of two adjacent LEDs on a first projection plane at least partially overlap, and the first projection plane is a plane perpendicular to the circuit board and parallel to the first straight line.

Alternatively, the circuit board may be a strip-shaped circuit board extending along the first straight line, and may include two long sides with longer lengths and two short sides with shorter lengths, wherein widths of the gap from an end near to one long side of the two long sides to an end near to the other long side of the two long sides are same.

Alternatively, shapes and structures of respective LEDs may be same.

Alternatively, each of the LEDs may include a first side end and a second side end opposite to the first side end, the first side end may have a first protrusion and the second side end may have a second protrusion; wherein the first side end of each of the LEDs is arranged near to the second side end of an adjacent LED, and a gap is formed between the first side end and the second side end;

the first protrusion of the first side end of each of the LEDs is interlaced with and matches the second protrusion of the second side end of the adjacent LED, and projections of the first protrusion and the second protrusion on the first projection plane at least partially overlap.

Alternatively, shapes of projections of the LEDs on a plane on which the circuit board is located may be parallelograms, the parallelograms each includes a first acute angle and a second acute angle diagonally arranged, wherein the first protrusion is formed on a portion corresponding to the first acute angle, and the second protrusion is formed on a portion corresponding to the second acute angle.

The first side end of each of the LED may be arranged to have a first sawtooth structure, and the first sawtooth structure may form the first protrusion; the second side end of each of the LED may be arranged to have a second sawtooth structure which matches the first sawtooth structure, and the second sawtooth structure may form the second protrusion.

Alternatively, the first side end of each of the LEDs may be arranged to have a first curved protrusion structure, and the first curved protrusion structure may form the first protrusion; the second side end of each of the LED may be arranged to have a second curved protrusion structure which matches the first curved protrusion structure, and the second curved protrusion structure may form the second protrusion.

Alternatively, each of the LEDs may include a first side end and a second side end opposite to the first side end, the first side end may have a first protrusion and the second side end may have a second protrusion; wherein the first side end of each of the LEDs is arranged near to the first side end of an adjacent LED, and a first gap is formed between the two first side ends;

the second side end of each of the LEDs is arranged near to the second side end of an adjacent LED, and a second gap is formed between the two second side ends;

wherein the first protrusion of the first side end of each of the LEDs is interlaced with and matches the first protrusion of the first side end of the adjacent LED, and projections of the first protrusion of the first side end of each of the LEDs and the first protrusion of the first side end of the adjacent LED on the first projection plane at least partially overlap;

wherein the second protrusion of the second side end of each of the LEDs is interlaced with and matches the second protrusion of second side end of the adjacent LED, and projections of the second protrusion of the second side end of each of the LEDs and the second protrusion of the second side end of the adjacent LED on the first projection plane at least partially overlap.

Alternatively, shapes of projections of the LEDs on a plane on which the circuit board is located may be trapezoids, the trapezoids each may include a third acute angle and a fourth acute angle, wherein the first protrusion is formed on a portion corresponding to the third acute angle, and the second protrusion is formed on a portion corresponding to the fourth acute angle.

Alternatively, the trapezoids may be isosceles trapezoids.

Alternatively, shapes of projections of the LEDs on a plane on which the circuit board is located may be triangles, the triangles each may include a fifth acute angle and a sixth acute angle, wherein the first protrusion is formed on a portion corresponding to the fifth acute angle, and the second protrusion is formed on a portion corresponding to the sixth acute angle.

Alternatively, the triangles may be isosceles triangles.

Alternatively, shapes and structures of the LEDs may be not all same. Alternatively, shapes of the LEDs may include parallelograms, trapezoids and triangles.

A backlight includes:
a light guide plate, including a light-entering surface, a light-exiting surface adjacent to the light-entering surface and a bottom surface opposite to the light-exiting surface; and the LED light strip described above, which is arranged on a light-entering side of the light guide plate, wherein the light-exiting surface and the first projection plane are in a same plane.

A display device includes the LED light strip described above.

The present disclosure has beneficial effects as follows:

In the LED light strip according to the present disclosure, since projections of two adjacent LEDs in a direction perpendicular to the circuit board at least partially overlap, the gaps can be overlaid in the direction perpendicular to the circuit board. Therefore, when the LED light strip is used in a backlight and the LED emits light, at least there is some light which can be propagated to a position corresponding to the gaps between adjacent LEDs on the light guide plate. Thus, the light can be mixed up in an up-down direction and a more sufficiently mixed light can be obtained. Compared to the conventional LED light strips, an insufficient light flux phenomenon at the gaps can be improved, thereby reducing the occurrence of the hotspot phenomenon.

DETAILED DESCRIPTION

Embodiments of the present disclosure will be further described below in conjunction with the accompanying drawings and examples. The following embodiments are merely used to illustrate the present disclosure, but not intended to limit the scope of the present invention.

With respect to the hotspot phenomenon caused by an existence of a gap in a light emitting diode (LED) light strip in the related art, the present disclosure provides an LED light strip, in which an insufficient light flux phenomenon at the gaps can be improved compared to the conventional LED light strips, thereby reducing the occurrence of the hotspot phenomenon.

As shown in FIGS. 4-9, the LED light strip provided by the present disclosure includes a circuit board 100 and a plurality of LEDs 200 which are arranged and spaced on the circuit board 100 along a first straight line. A gap 300 is formed between two adjacent LEDs 200, and projections of two adjacent LEDs 200 on a first projection plane at least partially overlap. And the first projection plane is a plane perpendicular to the circuit board 100 and parallel to the first straight line.

Figure 1:
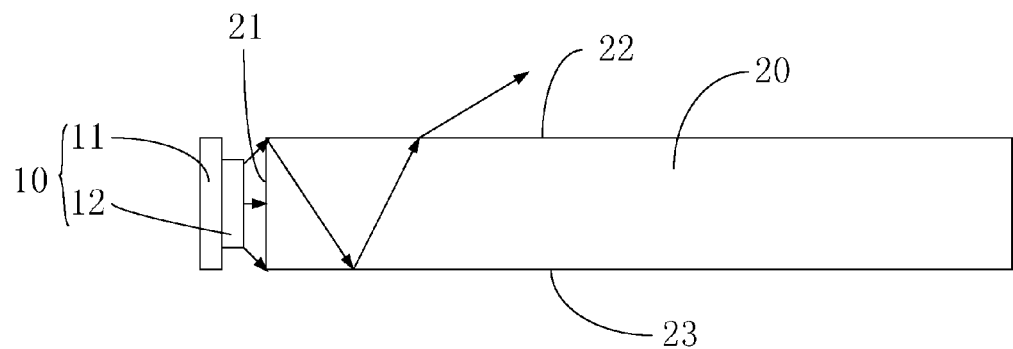
FIG. 1 is a schematic diagram showing structures of a light guide plate and an LED light strip in a conventional backlight.
Figure 2:
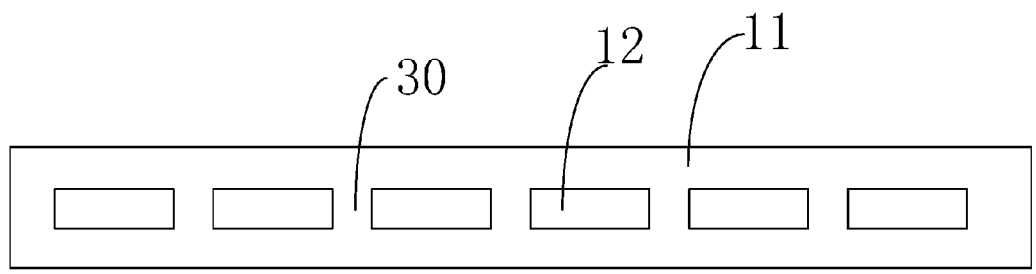
FIG. 2 is a front view of a LED light strip in a conventional backlight.
Figure 3:
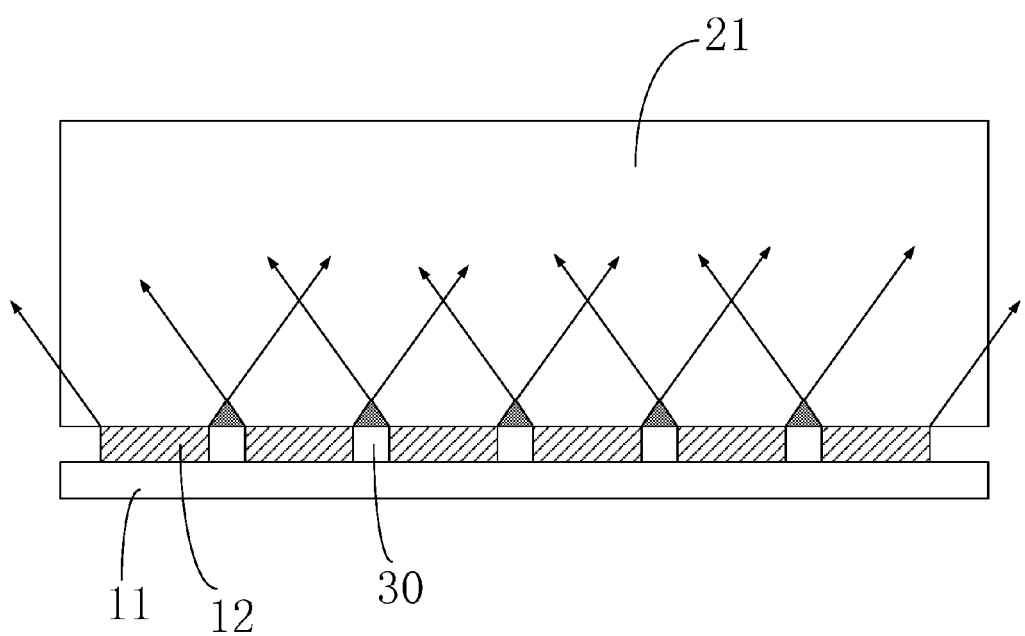
FIG. 3 is a schematic diagram showing a principle of an occurrence of a hotspot phenomenon caused by light emitted by a conventional LED light strip.
Figure 4:
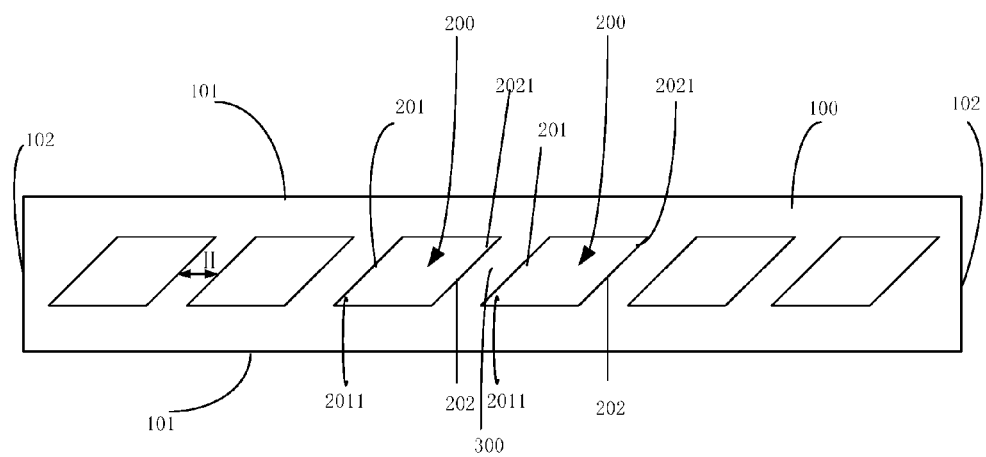
FIG. 4 is a schematic diagram showing a first structure of an LED light strip according to an embodiment of the present disclosure.
Figure 5:
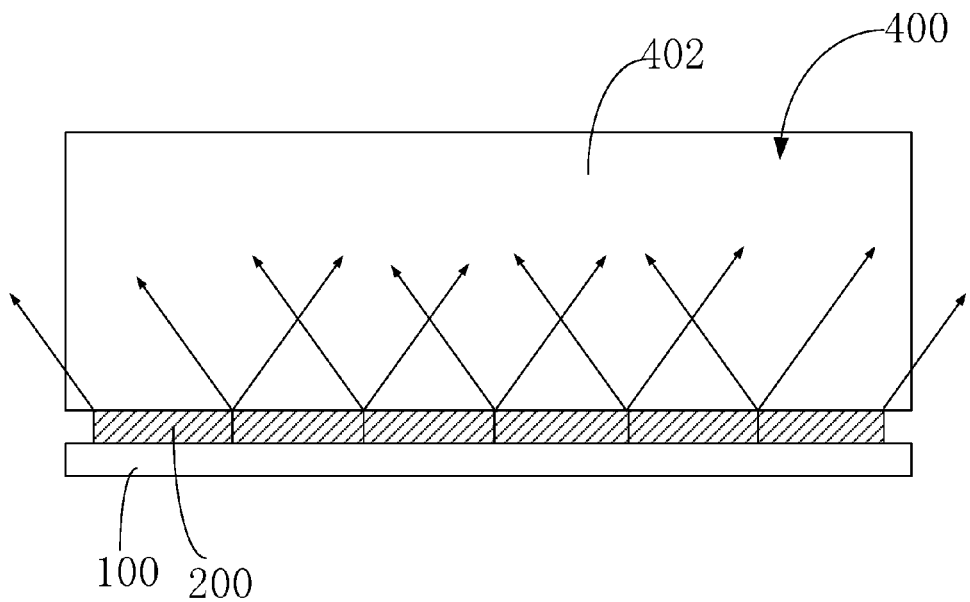
FIG. 5 is a schematic diagram showing a principle of reducing a hotspot phenomenon in an LED light strip according to the present disclosure.
Figure 9:
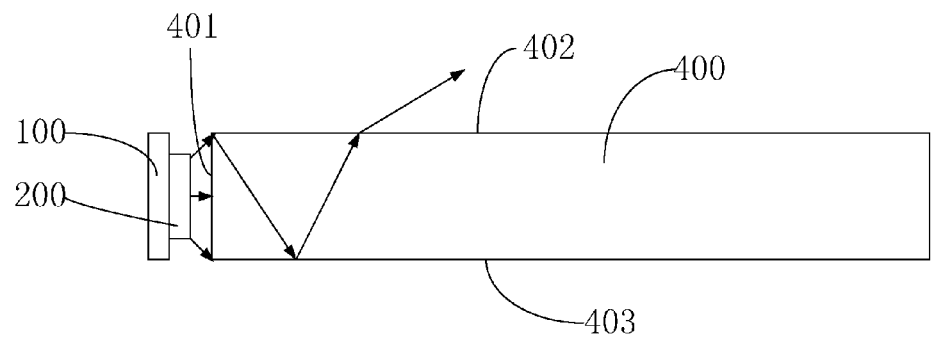
FIG. 9 is a schematic diagram showing a structure of a backlight according to the present disclosure.

Generally, as shown in FIG. 9, the LED light strips are arranged on a light-entering side of a light guide plate 400, and light-exiting surfaces of the LEDs 200 are arranged to face to a light-entering surface 401 of the light guide plate 400. Light emitted from the LEDs 200 is propagated between a light-exiting surface 402 and a bottom surface 403 of the light guide plate 400, and mixed. Using the above solution, as shown in FIGS. 4 and 9, since projections of two adjacent LEDs 200 in the LED light strip in a direction perpendicular to the circuit board 100 at least partially overlap, the gaps 300 can be overlaid in the direction perpendicular to the circuit board 100. That is, when the LED light strip is used in a backlight, projections of two adjacent LEDs 200 in the LED light strip on a plane on which the light-exiting surface 402 or the bottom surface 403 of the light guide plate 400 is located at least partially overlap. Therefore, when the LEDs 200 emit light, at least there is some light which can be propagated to a position corresponding to the gaps 300 between adjacent LEDs 200 on the light guide plate 400. Thus, when the light is propagated in the light guide plate 400, the light can be mixed up in an up-down direction and a more sufficiently mixed light can be obtained. Compared to the conventional LED light strips, an insufficient light flux phenomenon at the gap 300 can be improved, thereby reducing the occurrence of the hotspot phenomenon.

Alternatively, as shown in FIG. 4, the circuit board 100 is a strip-shaped circuit board 100 extending along the first straight line, and includes two long sides 101 with longer lengths and two short sides 102 with shorter lengths. A distance, in the gap 300, from an end near to one short side of the two short sides 102 to an end near to the other short side of the two short sides 102 is defined as a width H of the gap 300. And the widths H of the gap 300 from an end near to one long side 101 of the two long sides 101 to an end near to the other long side 101 of the two long sides 101 are same. That is, the widths H of the gap 300 from an end near to one long side 101 of the two long sides 101 to an end near to the other long side 101 of the two long sides 101 are kept consistent.

Using the above solutions, since the widths of the gap 300 are kept the same, a uniform mixing of light can be ensured. It can be understood that in practical applications, it is only needed to ensure that there is an overlapped portion of the projections of two adjacent LEDs 200 on the first projection plane, so as to ensure that there is some light which can be propagated to a position corresponding to the gap 300 on the light guide plate 400. The width and shape of the gap 300 formed by two adjacent LEDs 200 after they have been matched are not limited herein.

Furthermore, in a preferred embodiment of the present disclosure, shapes and structures of respective LEDs 200 are same. Using the above solution, the universality of the LEDs 200 can be improved, and the manufacturing of the LED light strip is more convenient and the cost thereof is lower. Moreover, the uniformity of the light mixing in the light guide plate 400 can be improved. Preferably, the widths H of the gaps formed between each two LEDs are all the same, to further improve the uniformity.

Furthermore, an embodiment of the present disclosure provides, as shown in FIG. 4, each of the LEDs 200 includes a first side end 201 and a second side end 202 opposite to the first side end 201. The first side end 201 has a first protrusion 2011, and the second side end 202 has a second protrusion 2021; wherein, the first side end 201 of each of the LEDs 200 is arranged near to the second side end 202 of an adjacent LED 200, and a gap 300 is formed between the first side end 201 and the second side end 202;

the first protrusion 2011 of the first side end 201 of each of the LEDs 200 is interlaced with and matches the second protrusion 2021 of the second side end 202 of the adjacent LED 200, and projections of the first protrusion 2011 and the second protrusion 2021 on the first projection plane at least partially overlap.

Using the above solution, the first side end 201 of each of the LEDs 200 is arranged near to the second side end 202 of an adjacent LED 200, that is, mounting directions of each of the LEDs 200 are same, which enables mounting processes of each of the LEDs 200 on the circuit board 100 may be same. By arranging the first protrusion and the second protrusion which can match each other on the first side end 201 and the second side end 202 of each of the LEDs 200 respectively, the object that projections on the first projection plane partially overlap can be achieved.

In the above technical solutions, it can be achieved that mounting directions of each of the LEDs 200 are same. There are many ways to implement the partially overlapping of projections of two adjacent LEDs 200 on the first projection plane. A first embodiment of the LED light strip according to the present disclosure will be provided.

First Embodiment

As shown in FIG. 4, in this embodiment, shapes of projections of the LEDs 200 on a plane on which the circuit board 100 is located are parallelograms, the parallelograms each includes a first acute angle and a second acute angle diagonally arranged. The first protrusion 2011 is formed on a portion corresponding to the first acute angle, and the second protrusion 2021 is formed on a portion corresponding to the second acute angle.

In this embodiment, a conventional rectangular LED 200 is modified to a parallelogram structure having acute angles on its cross section, and mounting method and mounting direction of each of the LEDs 200 are same. The gap 300 between two adjacent LEDs 200 forms an oblique gap 300, and protrusions corresponding to the acute angles formed by each of the LEDs 200 and an adjacent LED 200 match to each other. The projections on the first projection plane can overlay the gap 300. When the LEDs 200 emit light, the light forms a total internal reflection and is propagated in the light guide plate 400. At the same time, light emitted from the protrusions corresponding to the acute angles of the adjacent LEDs 200 on both sides of the gap 300, when occurs a total internal reflection in the light guide plate 400, can be fully mixed in an up-down direction, which solves the problem that the light flux at the gap 300 between the two adjacent LEDs 200 in the conventional rectangular LED light strip is insufficient and avoids the occurrence of hotspot phenomenon.

It should be noted that, in the above embodiment, each of the LEDs 200 has a parallelogram structure with acute angles on its cross section. It can be achieved by designing the packaging structures of the LEDs 200 to be three-dimensional structures having parallelogram structures with acute angles. In addition, the mounting process of each of the LEDs 200 on the circuit board 100 can be the same as that of conventional LEDs, for example, each of the LEDs 200 is welded on the circuit board 100 by using weld legs respectively.

Figure 8:
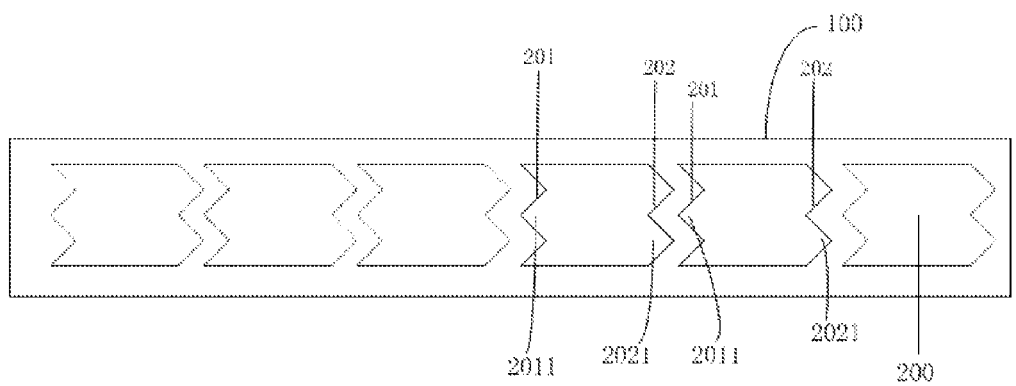
FIG. 8 is a schematic diagram showing a fourth structure of an LED light strip according to an embodiment of the present disclosure.

In the above embodiment, the first protrusions and the second protrusions are formed by portions of acute angles of the parallelograms. However, in other embodiments, the first protrusions and the second protrusions can also have other structures. For example, as shown in FIG. 8, the first side end 201 of each of the LEDs 200 is arranged to have a first sawtooth structure, and the first sawtooth structure forms the first protrusion 2011; the second side end 202 of each of the LEDs 200 is arranged to have a second sawtooth structure which matches the first sawtooth structure, and the second sawtooth structure forms the second protrusion 2021; or, the first side end 201 of each of the LEDs 200 is arranged to have a first curved protrusion structure 2011 separately, and the first curved protrusion structure forms the first protrusion 2011; the second side end 202 of each of the LEDs 200 is arranged to have a second curved protrusion structure which matches the first curved protrusion structure, and the second curved protrusion structure forms the second protrusion 2021; or the above protrusion structures can be combined, which will not be described herein.

In addition, in another embodiment of the present disclosure, each of the LEDs 200 has the same mounting direction; however, in other embodiments, two adjacent LEDs may be mounted to be interlaced and up-down-inverted with each other.

Figure 6:
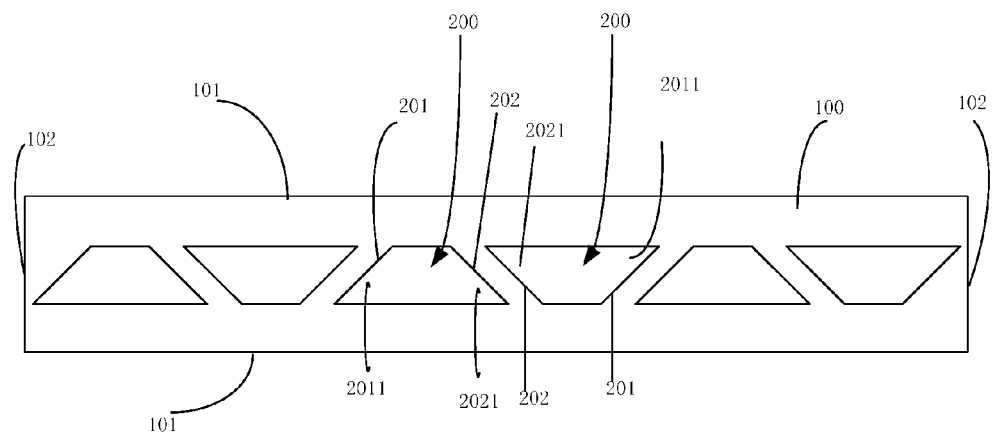
FIG. 6 is a schematic diagram showing a second structure of an LED light strip according to an embodiment of the present disclosure.

Alternatively, as shown in FIG. 6, each of the LEDs 200 includes a first side end 201 and a second side end 202 opposite to the first side end 201, the first side end 201 has a first protrusion 2011 and the second side end 202 has a second protrusion 2021; wherein the first side end 201 of each of the LEDs 200 is arranged near to the first side end 201 of an adjacent LED 200, and a first gap is formed between the two first side ends;

the second side end 202 of each of the LEDs 200 is arranged near to the second side end 202 of an adjacent LED 200, and a second gap is formed between the two second side ends;

wherein the first protrusion 2011 of the first side end 201 of each of the LEDs 200 is interlaced with and matches the first protrusion 2011 of the first side end 201 of the adjacent LED 200, and projections of the first protrusion 2011 of the first side end 201 of each of the LEDs 200 and the first protrusion 2011 of the first side end 201 of the adjacent LED 200 on the first projection plane at least partially overlap;

wherein the second protrusion 2021 of the second side end 202 of each of the LEDs 200 is interlaced with and matches the second protrusion 2021 of second side end 202 of the adjacent LED 200, and projections of the second protrusion 2021 of the second side end 202 of each of the LEDs 200 and the second protrusion 2021 of the second side 202 end of the adjacent LED 200 on the first projection plane at least partially overlap.

In the above embodiment, that the mounting direction of each of the LEDs 200 is interlaced can be achieved. There are many ways to implement the partially overlapping of projections of two adjacent LEDs 200 on the first projection plane. A second embodiment and a third embodiment of the LED light strip according to the present disclosure will be provided.

Second Embodiment

As shown in FIG. 6, in this embodiment, shapes of projections of the LEDs 200 on a plane on which the circuit board 100 is located are trapezoids, the trapezoids each includes a third acute angle and a fourth acute angle, wherein the first protrusion 2011 is formed on a portion corresponding to the third acute angle, and the second protrusion 2021 is formed on a portion corresponding to the fourth acute angle. Alternatively, the trapezoids are isosceles trapezoids.

In this embodiment, a conventional rectangular LED 200 is modified to a trapezoid structure having acute angles on its cross section, and mounting method of each of the LEDs 200 is same. However, the mounting directions of two adjacent LEDs 200 are inverted and interlaced with each other.

The first side end 201 of each of the LEDs 200 is arranged near to the first side end 201 of an adjacent LED 200 and a first gap is formed between the two first side ends 201. Besides, the first side end 202 of each of the LEDs 200 is arranged near to the first side end 202 of an adjacent LED 200 and a second gap is formed between the two first side ends 202. Both of the first gap and the second gap are oblique gaps. Protrusions corresponding to acute angles of each of the LEDs 200 and the adjacent LED 200 match to each other. The projections on the first projection plane can overlay the gap 300.

When the LEDs 200 emit light, the light forms a total internal reflection and is propagated in the light guide plate 400. At the same time, light emitted from the protrusions corresponding to the acute angles of the adjacent LEDs 200 on both sides of the gap 300, when occurs a total internal reflection in the light guide plate 400, can be fully mixed in an up-down direction, which solves the problem that the light flux at the gap 300 between the two adjacent LEDs 200 in the conventional rectangular LED light strip is insufficient and avoids the occurrence of hotspot phenomenon.

It should be noted that, in the above embodiment, each of the LEDs 200 has a trapezoid structure with acute angles on its cross section. It can be achieved by designing the packaging structures of the LEDs 200 to be three-dimensional structures having trapezoid structures with acute angles. In addition, the mounting process of each of the LEDs 200 on the circuit board 100 can be the same as that of conventional LEDs, for example, each of the LEDs 200 is welded on the circuit board 100 by using weld legs respectively.

In the above embodiment, the first protrusions and the second protrusions are formed by portions of acute angles of the trapezoids. However, in other embodiments, the first protrusions and the second protrusions can also have other structures, which will not be described herein.

Third Embodiment

Figure 7:
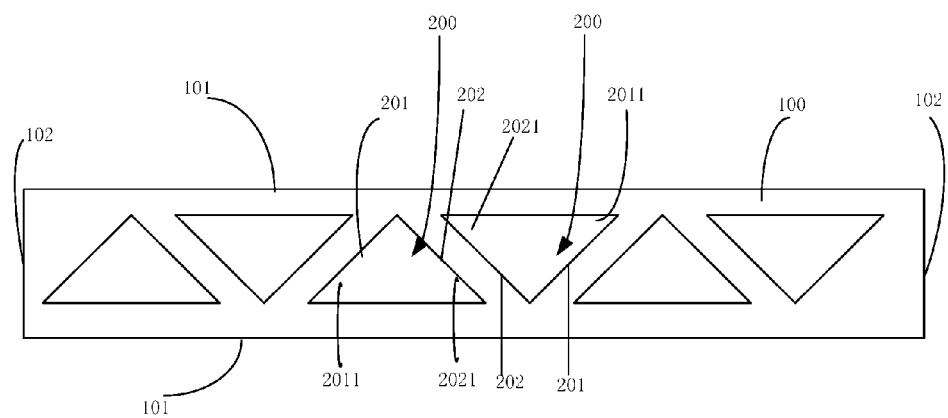
FIG. 7 is a schematic diagram showing a third structure of an LED light strip according to an embodiment of the present disclosure.

As shown in FIG. 7, in this embodiment, shapes of projections of the LEDs 200 on a plane on which the circuit board 100 is located are triangles, the triangles each includes a fifth acute angle and a sixth acute angle, wherein the first protrusion 2011 is formed on a portion corresponding to the fifth acute angle, and the second protrusion 2021 is formed on a portion corresponding to the sixth acute angle. Alternatively, the triangles are isosceles triangles.

In this embodiment, a conventional rectangular LED 200 is modified to a triangles structure having acute angles on its cross section, and mounting method of each of the LEDs 200 is same. However, the mounting directions of two adjacent LEDs 200 are inverted and interlaced with each other.

The first side end 201 of each of the LEDs 200 is arranged near to the first side end 201 of an adjacent LED 200 and a first gap is formed between the two first side ends 201. Besides, the first side end 202 of each of the LEDs 200 is arranged near to the first side end 202 of an adjacent LED 200 and a second gap is formed between the two first side ends 202. Both of the first gap and the second gap are oblique gaps. Protrusions corresponding to acute angles of each of the LEDs 200 and the adjacent LED 200 match to each other. The projections on the first projection plane can overlay the gap 300.

When the LEDs 200 emit light, the light forms a total internal reflection and is propagated in the light guide plate 400. At the same time, light emitted from the protrusions corresponding to the acute angles of the adjacent LEDs 200 on both sides of the gap 300, when occurs a total internal reflection in the light guide plate 400, can be fully mixed in an up-down direction, which solves the problem that the light flux at the gap 300 between the two adjacent LEDs 200 in the conventional rectangular LED light strip is insufficient and avoids the occurrence of hotspot phenomenon.

It should be noted that, in the above embodiment, the widths of the first gap and the second gap are same, which can further improve the uniformity of the light mixing in the light guide plate 400.

Figure 10:
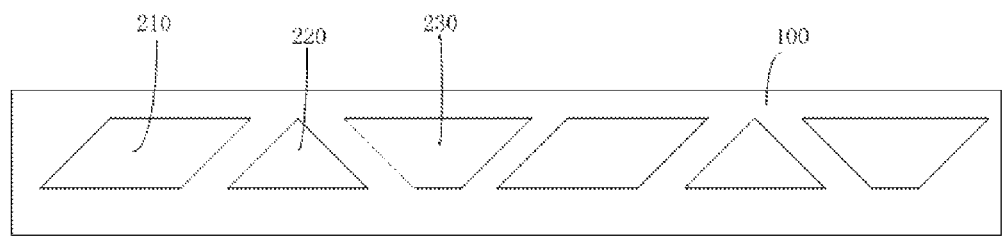
FIG. 10 is a schematic diagram showing a fifth structure of an LED light strip according to an embodiment of the present disclosure.
Figure 11:
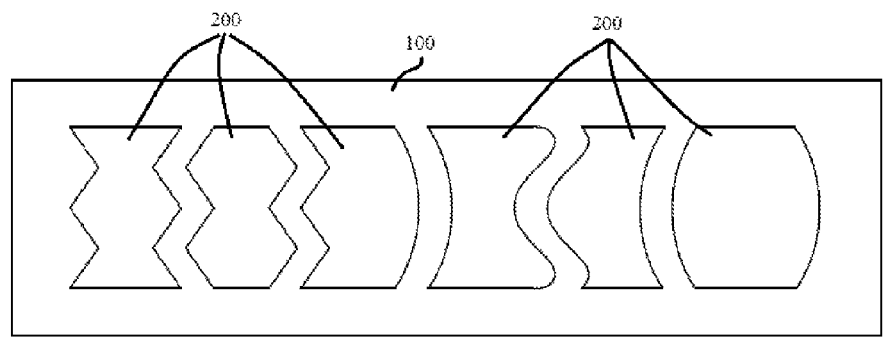
FIG. 11 illustrates an example of various combinations of LEDs having sawtooth and/or curved features.

In addition, it should be noted that, only the embodiments where the structures and shapes of each of the LEDs 200 are same are provided. However, in other embodiments, shapes of the plurality of LEDs 200 may be partially the same or totally different, as long as projections of two adjacent LEDs 200 on the first projection plane have overlapping portions. For example, as shown in FIG. 10, the LED light strip includes the first LED 210, the second LED 220 and the third LED 230 having different shapes, wherein the cross section of the first LED 210 is a parallelogram, the cross section of the second LED 220 is a triangle, and the cross section of the third LED 230 is a trapezoid. Portions corresponding to acute angles on the first LED 210, the second LED 220, and the third LED 230 match to each other, so that projections of two adjacent LEDs 200 on the first projection plane have overlapping portions.

Another object of the present disclosure is to provide a backlight. As shown in FIG. 9, the backlight includes:

a light guide plate 400, includes a light-entering surface 401, a light-exiting surface 402 adjacent to the light-entering surface 401 and a bottom surface 403 opposite to the light-exiting surface; and the LED light strip described above, which is arranged on a light-entering side of the light guide plate 400, wherein the light-exiting surface 402 and the first projection plane are in a same plane.

Yet another object of the present disclosure is to provide a display device, including the above-described LED light strip.

The above is only preferred embodiments of the present disclosure, it should be noted that several improvements and modifications may be made for a person skilled in the art without departing from the principle of the present disclosure, and also should be considered to fall within the protection scope of the present disclosure.

What is claimed is:

1. A light emitting diode (LED) light strip, comprising a circuit board and a plurality of LEDs which are arranged and spaced on the circuit board along a first straight line, wherein a gap is formed between two adjacent LEDs;
   wherein projections of two adjacent LEDs on a first projection plane at least partially overlap, and the first projection plane is a plane perpendicular to the circuit board and parallel to the first straight line; and
   wherein shapes and structures of each of the plurality of LEDs are not all the same.

2. The LED light strip according to claim 1, wherein the circuit board is a strip-shaped circuit board extending along the first straight line, and comprises two long sides with longer lengths and two short sides with shorter lengths,
   wherein widths of the gap from an end near to one long side of the two long sides to an end near to the other long side of the two long sides are the same.

3. The LED light strip according to claim 1, wherein shapes and structures of some of the plurality of LEDs are the same.

4. The LED light strip according to claim 3, wherein each of the LEDs comprises a first side end and a second side end opposite to the first side end, the first side end has a first protrusion and the second side end has a second protrusion; wherein
   the first side end of each of the LEDs is arranged near to the second side end of an adjacent LED, and a gap is formed between the first side end and the second side end;
   the first protrusion of the first side end of each of the LEDs is interlaced with and matches the second protrusion of the second side end of the adjacent LED, and projections of the first protrusion and the second protrusion on the first projection plane at least partially overlap.

5. The LED light strip according to claim 4, wherein some of the shapes of projections of the LEDs on a plane on which the circuit board is located are parallelograms, the parallelograms each comprises a first acute angle and a second acute angle diagonally arranged, wherein the first protrusion of each of the parallelogram shaped LEDs is formed on a portion corresponding to the first acute angle, and the second protrusion of each of the parallelogram shaped LEDs is formed on a portion corresponding to the second acute angle.

6. The LED light strip according to claim 4, wherein
   the first side end of each of the LEDs is arranged to have a first sawtooth structure, and the first sawtooth structure forms the first protrusion;
   the second side end of each of the LEDs is arranged to have a second sawtooth structure which matches the first sawtooth structure, and the second sawtooth structure forms the second protrusion.

7. The LED light strip according to claim 4, wherein
   the first side end of each of the LEDs is arranged to have a first curved protrusion structure, and the first curved protrusion structure forms the first protrusion;
   the second side end of each of the LEDs is arranged to have a second curved protrusion structure which matches the first curved protrusion structure, and the second curved protrusion structure forms the second protrusion.

8. The LED light strip according to claim 3, wherein each of the LEDs comprises a first side end and a second side end opposite to the first side end, the first side end has a first protrusion and the second side end has a second protrusion; wherein
   the first side end of each of the LEDs is arranged near to the first side end of an adjacent LED, and a first gap is formed between the two first side ends;
   the second side end of each of the LEDs is arranged near to the second side end of a second adjacent LED, and a second gap is formed between the two second side ends;
   wherein the first protrusion of the first side end of each of the LEDs is interlaced with and matches the first protrusion of the first side end of the adjacent LED, and projections of the first protrusion of the first side end of each of the LEDs and the first protrusion of the first side end of the adjacent LED on the first projection plane at least partially overlap;
   wherein the second protrusion of the second side end of each of the LEDs is interlaced with and matches the second protrusion of second side end of the second adjacent LED, and projections of the second protrusion of the second side end of each of the LEDs and the second protrusion of the second side end of the second adjacent LED on the first projection plane at least partially overlap.

9. The LED light strip according to claim 8, wherein some of the shapes of projections of the LEDs on a plane on which the circuit board is located are trapezoids, the trapezoids each comprises a third acute angle and a fourth acute angle, wherein the first protrusion of each of the trapezoid shaped LEDs is formed on a portion corresponding to the third acute angle, and the second protrusion of each of the trapezoid shaped LEDs is formed on a portion corresponding to the fourth acute angle.

10. The LED light strip according to claim 9, wherein the trapezoids are isosceles trapezoids.

11. The LED light strip according to claim 8, wherein some of the shapes of projections of the LEDs on a plane on which the circuit board is located are triangles, the triangles each comprises a fifth acute angle and a sixth acute angle, wherein the first protrusion of each of the triangle shaped LEDs is formed on a portion corresponding to the fifth acute angle, and the second protrusion of each of the triangle shaped LEDs is formed on a portion corresponding to the sixth acute angle.

12. The LED light strip according to claim 11, wherein the triangles are isosceles triangles.

13. The LED light strip according to claim 1, wherein shapes of the LEDs include at least one of parallelograms, trapezoids and triangles.

14. A backlight, comprising:
a light guide plate, comprising a light-entering surface, a light-exiting surface adjacent to the light-entering surface and a bottom surface opposite to the light-exiting surface; and
a light emitting diode (LED) light strip, which is arranged on a light-entering side of the light guide plate,
wherein the LED light strip comprises a circuit board and a plurality of LEDs which are arranged and spaced on the circuit board along a first straight line, wherein a gap is formed between two adjacent LEDs;
wherein projections of two adjacent LEDs on a first projection plane at least partially overlap, and the first projection plane is a plane perpendicular to the circuit board and parallel to the first straight line; and
wherein the light-exiting surface and the first projection plane are in a same plane; and
wherein shapes and structures of each of the plurality of LEDs are not all the same.

15. The backlight according to claim 14, wherein the circuit board is a strip-shaped circuit board extending along the first straight line, and comprises two long sides with longer lengths and two short sides with shorter lengths,
wherein widths of the gap from an end near to one long side of the two long sides to an end near to the other long side of the two long sides are the same.

16. The backlight according to claim 14, wherein shapes and structures of some of the plurality of LEDs are the same.

17. The backlight according to claim 14, wherein shapes of the LEDs include at least one of parallelogram, trapezoid and triangle.

18. A display device, comprising a backlight,
wherein the backlight comprises:
a light guide plate, comprising a light-entering surface, a light-exiting surface adjacent to the light-entering surface and a bottom surface opposite to the light-exiting surface; and
a light emitting diode (LED) light strip, which is arranged on a light-entering side of the light guide plate,
wherein the LED light strip comprises a circuit board and a plurality of LEDs which are arranged and spaced on the circuit board along a first straight line, wherein a gap is formed between two adjacent LEDs;
wherein projections of two adjacent LEDs on a first projection plane at least partially overlap, and the first projection plane is a plane perpendicular to the circuit board and parallel to the first straight line; and
wherein the light-exiting surface and the first projection plane are in a same plane; and
wherein shapes and structures of each of the plurality of LEDs are not all the same.

19. The display device according to claim 18, wherein shapes of the LEDs include at least one of parallelogram, trapezoid and triangle.

20. The display device according to claim 18, wherein the circuit board is a strip-shaped circuit board extending along the first straight line, and comprises two long sides with longer lengths and two short sides with shorter lengths,
wherein widths of the gap from an end near to one long side of the two long sides to an end near to the other long side of the two long sides are the same.

\* \* \* \* \*